(12) United States Patent
Kampmann et al.

(10) Patent No.: US 10,750,574 B2
(45) Date of Patent: Aug. 18, 2020

(54) LOCAL SWITCHING

(75) Inventors: Dirk Kampmann, GP Vaals (NL);
Karl Hellwig, Wonfurt (DE); Philip Hodges, Melbourne (AU); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1076 days.

(21) Appl. No.: 13/319,147

(22) PCT Filed: Jul. 24, 2009

(86) PCT No.: PCT/EP2009/059592
§ 371 (c)(1),
(2), (4) Date: Jan. 18, 2012

(87) PCT Pub. No.: WO2010/127717
PCT Pub. Date: Nov. 11, 2010

(65) Prior Publication Data
US 2012/0178453 A1 Jul. 12, 2012

Related U.S. Application Data

(60) Provisional application No. 61/176,639, filed on May 8, 2009.

(51) Int. Cl.
*H04W 88/14* (2009.01)
*H04W 92/14* (2009.01)
(Continued)

(52) U.S. Cl.
CPC ......... *H04W 88/14* (2013.01); *H04W 76/22* (2018.02); *H04W 88/12* (2013.01); *H04W 92/14* (2013.01); *H04W 76/11* (2018.02)

(58) Field of Classification Search
CPC ............. H04W 76/041; H04L 65/1016; H04L 65/1069; H04L 65/104; H04L 65/1006;
(Continued)

(56) References Cited

U.S. PATENT DOCUMENTS 644,913 A * 3/1900 Baylor et al. ............ 52/330
5,970,134 A * 10/1999 Highland et al. ...... 379/265.02
(Continued)

FOREIGN PATENT DOCUMENTS

| CN | 101068204 A | 11/2007 |
|---|---|---|
| WO | 2006/126923 A1 | 11/2006 |
| WO | 2008/133558 A1 | 11/2008 |

OTHER PUBLICATIONS

3rd Generation Partnership Project, Source: GERAN, "LS on New GERAN WI on 'Local Call Local Switch,'" 3GPP TSG GERAN WG2 Meeting #41, GP-090569, p. 1, St. Julians, Malta, Feb. 16-20, 2009.
(Continued)

*Primary Examiner* — Natasha W Cosme
(74) *Attorney, Agent, or Firm* — Coats & Bennett PLLC

(57) ABSTRACT

The invention proposes to introduce a method for a Radio Access Network for providing "Local Switching" between call legs of a call. Within said method the Radio Access Network receives a call identifier for a leg of a call from a Core Network to be handled by the Radio Access Network. The Radio Access Network stores said received call identifier, compares said received call identifier with stored call identifiers for call legs of calls via said Radio Access Network. If said received call identifier matches a stored call identifier the Radio Access Networks establish local switching of call legs identified by the matching call identifier. In an alternative embodiment, the invention proposes to introduce a method for a Core Network for providing local switching for call legs of a call. Within said method the Core Network receives or generates a call identifier for a leg of a call. The Core Network stores said received call identifier and identifies a respective Radio Access Network for said leg of said call. Thereafter, the Core Network compares said call received identifier with stored call identifiers for call
(Continued)

legs of calls via said identified Radio Access Network. If said received call identifier matches a stored call identifier enforce local switching of call legs identified by the matching call identifier. The invention furthermore provides for respective Nodes of the respective Networks employing the invention.

25 Claims, 6 Drawing Sheets

(51) Int. Cl.
*H04W 88/12* (2009.01)
*H04W 76/22* (2018.01)
*H04W 76/11* (2018.01)

(58) Field of Classification Search
CPC . H04L 65/1023; H04L 12/66; H04L 65/1053; H04L 65/1033; H04L 29/06176; H04L 65/1083; H04L 65/1096; H04L 65/103; H04L 65/105; H04L 65/80; H04L 65/1043; H04L 65/1063; H04M 7/006; H04M 15/00; H04M 15/63; H04M 15/57; H04M 15/8292; H04M 2215/208; H04M 2203/1091; H04M 3/42042; H04M 3/42314; H04M 7/0075; H04M 3/38; H04M 3/54; H04M 2207/18; H04M 2203/6081; H04M 3/56; H04M 7/123
USPC ........................................ 455/436; 379/93.01
See application file for complete search history.

(56) References Cited

U.S. PATENT DOCUMENTS

| | | | | |
|---|---|---|---|---|
| 6,570,869 | B1* | 5/2003 | Shankar et al. | 370/352 |
| 7,948,977 | B2 | 5/2011 | Bennett | |
| 2002/0097693 | A1* | 7/2002 | Costa | H04W 76/041 370/329 |
| 2003/0233456 | A1* | 12/2003 | Shew | H04Q 3/0016 709/227 |
| 2005/0119005 | A1* | 6/2005 | Segal | H04W 36/14 455/445 |
| 2007/0064686 | A1* | 3/2007 | Bae | H04W 36/0011 370/356 |
| 2008/0037533 | A1* | 2/2008 | Wah | H04L 65/1046 370/389 |
| 2008/0108356 | A1* | 5/2008 | Tamura | H04B 7/022 455/445 |
| 2011/0110295 | A1* | 5/2011 | Parolari | H04W 8/082 370/328 |

OTHER PUBLICATIONS

3rd Generation Partnership Project, Source: Nokia Siemens Networks, "Local Switching with an IP-based A Interface," 3GPP TSG-GERAN #36, Tdoc GP071810, pp. 1-4, Vancouver, Canada, Nov. 12-16, 2007.
3rd Generation Partnership Project, DRAFT Meeting Report for 3GPP WG CT3 Meeting: 52, pp. 1-26, Sophia Antipolis, France, Apr. 20-24, 2009.

* cited by examiner

LOCAL SWITCHING

TECHNICAL FIELD

The invention relates to the field of telecommunication and more specifically to Local Switching in the case of local mobile-to-mobile calls.

BACKGROUND

In today's circuit switched telecommunications networks payload traffic and signaling are handled in different logical networks. Signaling traffic pertains to the signaling plane while the payload traffic is transported in the user plane.

The user plane of a call between two radio terminals, such as GSM terminals, is routed from a Base Station Subsystem (BSS) network to a core network and back to a BSS network. This procedure is performed irrespective of the location of a call, more precisely: irrespective of the locations of the involved mobile stations.

Hence, even when the call is "local", i.e. both, the terminating and originating party, are served by the same Base Station Subsystem, e.g. within the same radio cell, the user plane is routed through the core network.

Currently it is under discussion in 3GPP standardization bodies to introduce "local switching" in case one single BTS (Base Transceiver Station) or one BTS-cluster or one single BSS (Base Station Subsystem is controlled by one Base Station Controller) is involved in the call, i.e. both radio terminals of a mobile-to-mobile call are served by the same radio access network.

It is proposed in 3GPP that the MSC signals towards the BSC for each call leg a kind of "call leg identifier".

The BSS uses the call identifier(s) to correlate the two call legs. If the BSS received on both A-interfaces an indication that the controlling MSC(s) agree(s) to perform local switching and if the BSS identifies that the situation in the BSS allows establishment of local switching, then it performs a procedure to establish local switching. That means the user plane traffic between calling and called subscriber is switched locally inside the BSS network, bypassing the core network.

Problems with Existing Solution Proposals

In discussions to date, the Mobile Switching Center, when it establishes a call, does not know whether the BSC/BSS supports local switching or not. This might be an issue, if for some reason a BSS is, due to constraints in the operation, not able to perform Local Switching all the time or if a BSC/BSS is not able at all to support Local Switching. To overcome this issue, the MSC would have to trigger further, additional actions that may add processing load on one or more Core Network (CN) nodes, as well as signaling load to prepare for supporting local switching, even in cases, where the BSC is not capable to support local switching at all.

To overcome the drawbacks, one option is to maintain a (hand-administered or automatically generated) quasi-static database retrievable by an MSC, whether a certain BSC is in principle able/configured to support Local Switching. However, such a solution is not flexible, i.e. it is rather static and may even be out-dated and puts an additional Operation & Maintenance burden on the operator. Especially, such a solution would fail if Local Switching is only supported in some geographical parts of the area served by a particular BSS.

Furthermore, in today's mixed networks offering a variety of Radio Access Technologies, like GSM, UMTS and LTE, it may happen that a call starts as UMTS-UMTS (3G-3G) call without the ability for Local Switching. However, in a later stage the 3G network may perform Handover to GSM (2G) on both call legs, ending in a 2G-2G call. Today's procedures do not allow switching said call locally, even if said call, would it have started as a 2G-2G call, could have been locally switched.

Additionally, current discussion in 3GPP focused on two options, either to keep the A-interface user plane resources during local switching or to release them. Still further, when local switching is applied and A-interface user plane resources are released, then it may happen that an event mandates to break local switching and to re-establish the A-interface user plane resource.

Currently it is proposed in 3GPP to break the local switching and re-establish the user plane connection through the core network in both directions for all Supplementary Services without differentiation.

Assuming the event is a specific Service, like an announcement played to one subscriber, then unnecessary resources are wasted, because it would be sufficient to establish the user plane only on one side and only in downlink and only for the time period the announcement is played.

The current discussion in 3GPP includes the following scenario: A GSM-to-GSM call is connected from BSS1 to CN to BSS2 without Local Switching. Now a handover procedure is performed on one side, e.g. from BSS1 to BSS2. After HO local switching is possible in BSS2.

The hand over procedure is proposed to be modified to allow the BSS2 to immediately perform local switching, if possible. It is proposed that the CN is notified after local switching is established. The proposed procedure overlooks the situation that the 2nd call leg (without Handover) is changed in a way (e.g. by a request for a Supplementary Service) so that local switching shall not be performed anymore.

All in all, the solutions presented so far are inflexible and/or create additional load and/or miss certain functionality and/or are not optimal.

SUMMARY

To overcome one, more or all of the above mentioned drawbacks, the Invention proposes to introduce a method for a Radio Access Network for providing local switching for call legs of a call. Within said method the Radio Access Network receives a call identifier for a leg of a call from a Core Network to be handled by the Radio Access Network. The Radio Access Network stores said received call identifier, compares said received call identifier with stored call identifiers for other call legs of calls via said Radio Access Network. If said received call identifier matches a stored call identifier, the Radio Access Network establishes local switching of call legs identified by the matching call identifier.

In an alternative embodiment, the invention proposes to introduce a method for a Core Network for providing local switching for call legs of a call. Within said method the Core Network receives or generates a call identifier for a leg of a call. The Core Network stores said received call identifier and identifies a respective Radio Access Network for said leg of said call. Thereafter, the Core Network compares said received call identifier with stored call identifiers for call legs of calls via said identified Radio Access Network. If said received call identifier matches a stored call identifier, the Core Network enforces local switching of call legs identified by the matching call identifier.

The invention furthermore provides for respective Nodes of the respective Networks employing the invention.

DETAILED DESCRIPTION

In the following, the invention will be described with respect to the figures. It is to be understood that the explanations given in the following are not limited to a particular Radio Access Technology, but may be applied to any appropriate Telecommunication System. Furthermore, like references are used in the figures to indicate like elements.

a) Call Set-Up Case

Figure 1:
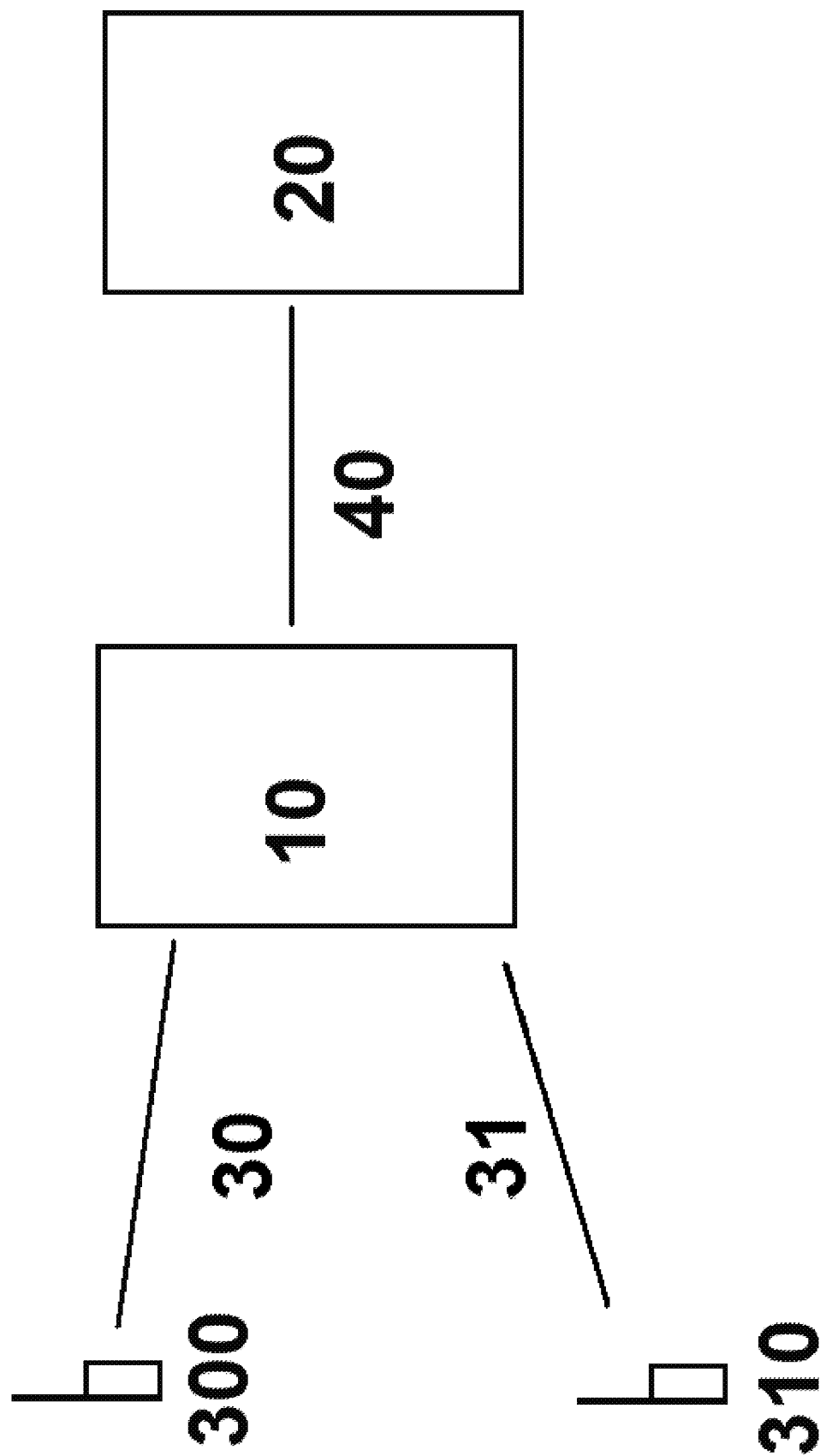
FIG. 1 shows exemplary logical arrangement of a telecommunication network allowing for employing the invention

In FIG. 1, an exemplary logical arrangement of a telecommunication network allowing for employing the invention is shown.

In such an arrangement, a first User Equipment (UE) 300, in the following referred to as "first UE", such as a Mobile Terminal, may connect via a radio link 30 towards a Radio Access Network (RAN) 10. Furthermore, another User Equipment (UE) 310, in the following referred to as "second UE", such as a Mobile Terminal, may connect via a corresponding radio link 31 towards the same Radio Access Network (RAN) 10.

The RAN 10 in turn is connected via a link 40 to a Core Network 20. The radio access network 10 as well as the Core Network 20 may be embodied by a plurality of interworking nodes, which are for simplicity not further detailed.

Figure 5:
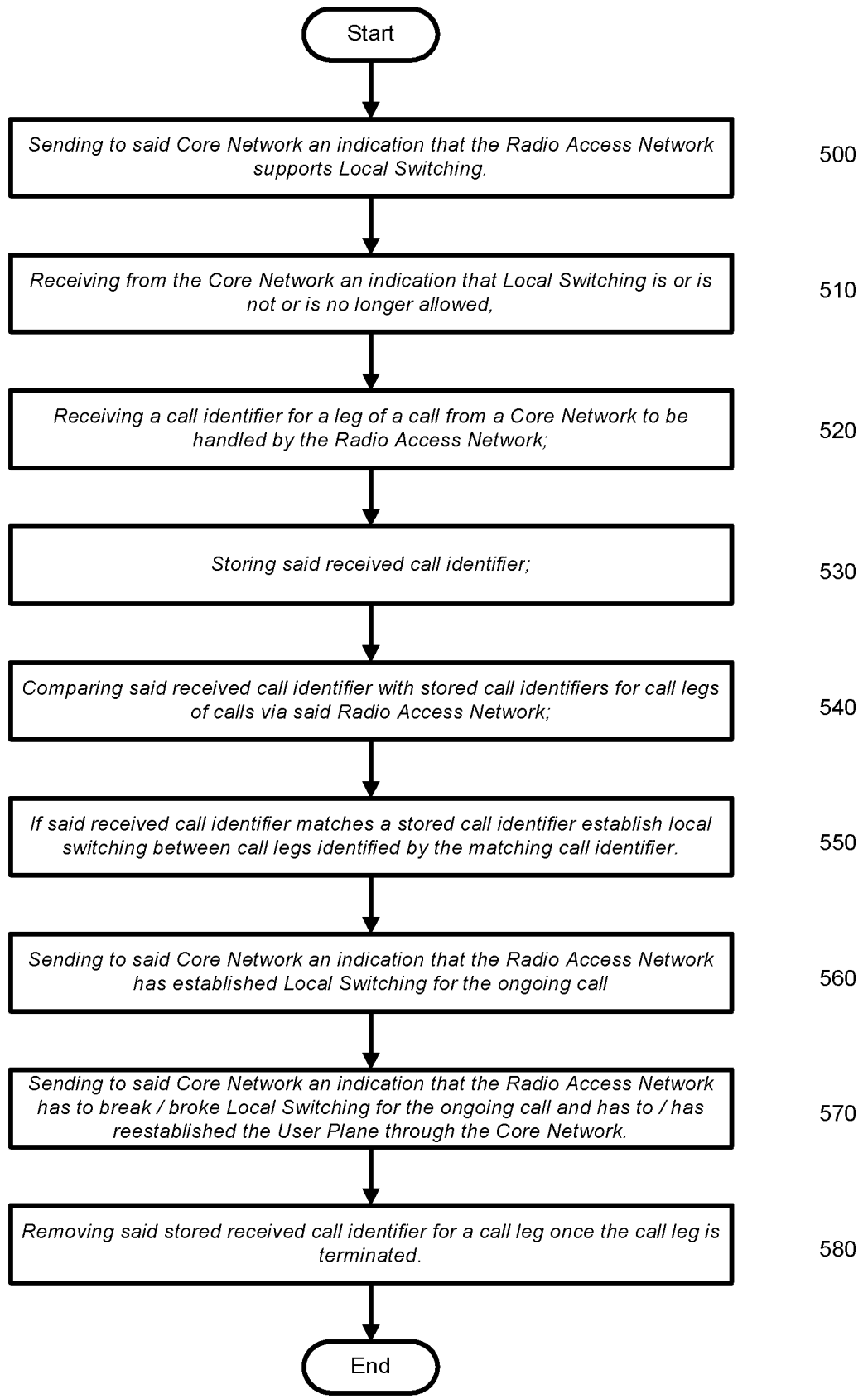
FIG. 5 shows an exemplary flowchart for a method performed by a Radio Access Network according to embodiments of the invention.

In the following reference will also be made to FIG. 5, in which an exemplary flowchart for a method performed by a Radio Access Network according to embodiments of the invention is shown. It is noted that certain method steps may be arranged in a different order and that the order shown in FIG. 5 is of exemplary nature.

When the first User Equipment (UE) 300 sets up a call, it sends a call set-up message towards the Radio Access Network 10 and it is attached to via link 30. In the course of the set-up, several messages may be exchanged.

The RAN 10 informs the Core Network (CN) 20 of the call set-up attempt via an appropriate message, which in turn queries where to find the called party.

In the following it is assumed that the called party is the second User Equipment (UE) 310. It will be apparent to those skilled in the art that the invention is not limited to this case but may also be employed in other call scenarios such as conference calls.

In the assumed call case, the call once established will consist of two call legs, a first call leg from the originating, first UE 300 to the Radio Access Network 10, and a second call leg from the Radio Access Network 10 to the terminating, second UE 310.

The information indicating general support for Local Switching provided by the RAN 10 towards the CN 20 may be embodied in a new information element which may be introduced in an existing handling protocol, e.g. in the BSSAP Complete Layer 3 message, a message that can be used by the RAN, e.g. the BSC, to indicate specific capabilities. The information may even be used to provide the information on a per-call and/or a per-call-leg basis. Such information may be used by the CN to evaluate whether tasks related to local switching shall be performed or not.

The Core Network 20 sends via link 40 towards the Radio Access Network 10 appropriate messages for each call leg to be handled by the Radio Access Network 10. In the described case, it will send set-up related messages for both call-legs to the same RAN 10.

In the following a first embodiment, a RAN centric approach, will be further detailed.

Within these set-up related messages according to the invention a "Call Identifier" of the call shall be sent to each call leg, e.g. in a step 520.

In a preferred embodiment said call identifier is unique.

The Radio Access Network 10 stores the received call identifier, e.g. in a step 530. The received call identifier is then compared with other stored call identifiers for call legs via the same radio access network 10, e.g. in a step 540. Stored call legs may be related to both, ongoing call legs and/or other call legs to be set-up.

In the case that the received call identifier matches a stored call identifier, the Radio Access Network 10 prepares establishment of local switching of the call legs identified by the matching call identifier, e.g. in a step 550.

In the example described, the CN 20 will provide a call identifier in a respective messages for the originating leg of the call, e.g. in a response message to the call set-up message received by RAN 10, for example the "Assignment Request Message", towards the RAN 10 and/or the CN 20 will provide the call identifier in a respective message for the terminating leg of the call, e.g. in a similar "Assignment Request Message" for the terminating leg received by RAN 10.

Obviously, the CN 20 may generate this call identifier or it may receive the call identifier, e.g. by another (not depicted) Core Network, another Core Network Node, or for example the originating RAN 10 itself creates such a call identifier in the course of receiving a call set-up request from the originating User Equipment.

The RAN 10 can then store the call identifiers in a memory or a database and can compare the received new call identifiers with the stored identifiers.

If a certain Radio Access Technology or Core Network Technology already allows for usage of call identifiers, it is preferred to reuse these identifiers, when appropriate, for simplicity. Such an identifier may be the "Global Call Reference", which is currently defined in ITU-T Recommendations for signalling on Network-Network interfaces and can be utilised to provide a globally unique Identifier for the call. The Global Call Reference is currently not specified in 3GPP specifications, however it can be generated in an originating Call Control Node of the Core Network, e.g. an MSC (oMSC) and may be used throughout the call in all Core and Transit Networks, even across all operators worldwide (global) to bind the charging together.

In a further embodiment, it is foreseen that the RAN 10 may inform the CN 20 that it allows for Local Switching for said call, e.g. in a step 500. Local Switching may be thereby easily deployed without having a need to reconfigure the network, i.e. the information indicated that the RAN 10 is prepared for Local Switching, and it might even be possible to restrict the usage of Local Switching depending on certain constraints in the Radio Network, e.g. on a call by call basis, i.e. to allow local switching on a call by call basis. Depending on the nature of the indication that Local Switching is allowed, it might be received for each call, each call leg or as a general indication.

In a further embodiment, it is foreseen that the RAN 10 informs the CN 20 that the Local Switching has been established for the ongoing call, e.g. in a step 560.

The information provided by the RAN 10 towards the CN 20 may be embodied in a new message or information element which may be introduced in an existing handling protocol. E.g. in the BSSAP Complete Layer 3 message, it could be included that the RAN is prepared for local switching.

In still a further embodiment, a previously received and stored call identifier is removed from the group of stored call identifiers once the call leg is terminated, e.g. in a step 580.

In preferred embodiments, the call identifier is exchanged in early call set-up phase allowing for a fast handling of the Local Switching.

In still further embodiments, the Core Network 20 may provide an indication towards the RAN whether Local Switching of call legs pertaining to a call identifier is allowed or is not allowed or is no longer allowed, e.g. in a step 510. E.g. in certain cases it might be appropriate not to allow Local Switching, e.g. for playing announcements or for other reasons, like Legal Intercept.

Furthermore, in order to avoid fraud, the establishment of local switching may be made subject to further conditions, i.e. that a certain call phase is reached.

The following will highlight this issue: In certain phases of a call the local switching may not be appropriate, for example in the phase, where the terminating mobile is still in its "ringing phase" and the terminating user has still not accepted the call: here the radio access links may already be established, but the users are not allowed to be through-connected until they explicitly agree (by accepting the call) that the charging begins.

Therefore, as a condition for establishment of Local Switching it may be foreseen that the CN shall indicate towards the Radio Access Network to enable local switching when the CN, e.g. a respective MSC, sends the "Connect" message to the UE and the MGW.

In a still further embodiment the Radio Access Network may send an indication towards the CN that the Radio Access Network has broken the Local Switching for the ongoing call and has already reestablished Switching of the User Plane through the Core Network, e.g. in a step 570. For this embodiment the User Plane through the Core Network is kept established during the duration of the call.

In a still further embodiment the Radio Access Network may send an indication towards the CN that the Radio Access Network has to break the Local Switching for the ongoing call and needs to reestablish Switching of the User Plane through the Core Network, e.g. in a step 570, before the Radio Access Network actually breaks the Local Switching, in order for the Core Network to re-establish all necessary User Plane resources in time. For this embodiment the User Plane through the Core Network may be released during most of the duration of the call.

In a still further embodiment the Core Network may send an indication towards the RAN that the Radio Access Network shall break (or shall not establish) the Local Switching for the ongoing call and shall reestablished (or shall keep) the Switching of the User Plane through the Core Network. This can be understood as a further condition which is not met, e.g. in step 550.

The Core Network may optionally indicate that a) the whole User Plane shall be switched back to the Core Network, i.e. for call legs in both directions, or b) the User Plane shall be switched back to the Core Network for particular call leg(s), e.g. one or the other or both call leg(s) in downlink direction (e.g. to play an announcement to one or both), or c) the User Plane shall be switched back to the Core Network for particular call leg(s), e.g. one or the other or both call legs(s) in uplink direction (e.g. to use the User Plane signals also for other services within the Core Network.

This may happen if due to some reasons, the Local Switching breaks, e.g. when a Handover for one of the UE is necessary towards a further RAN or for other reasons, e.g. when the used Codec Type has to be changed. In the FIG. 2, this might happen if UE 310 moves back in the Area of RAN 50 and needs to reestablish a link 32 instead of link 31 towards RAN 10

In an alternative embodiment, a core network centric approach may be employed.

Figure 6:
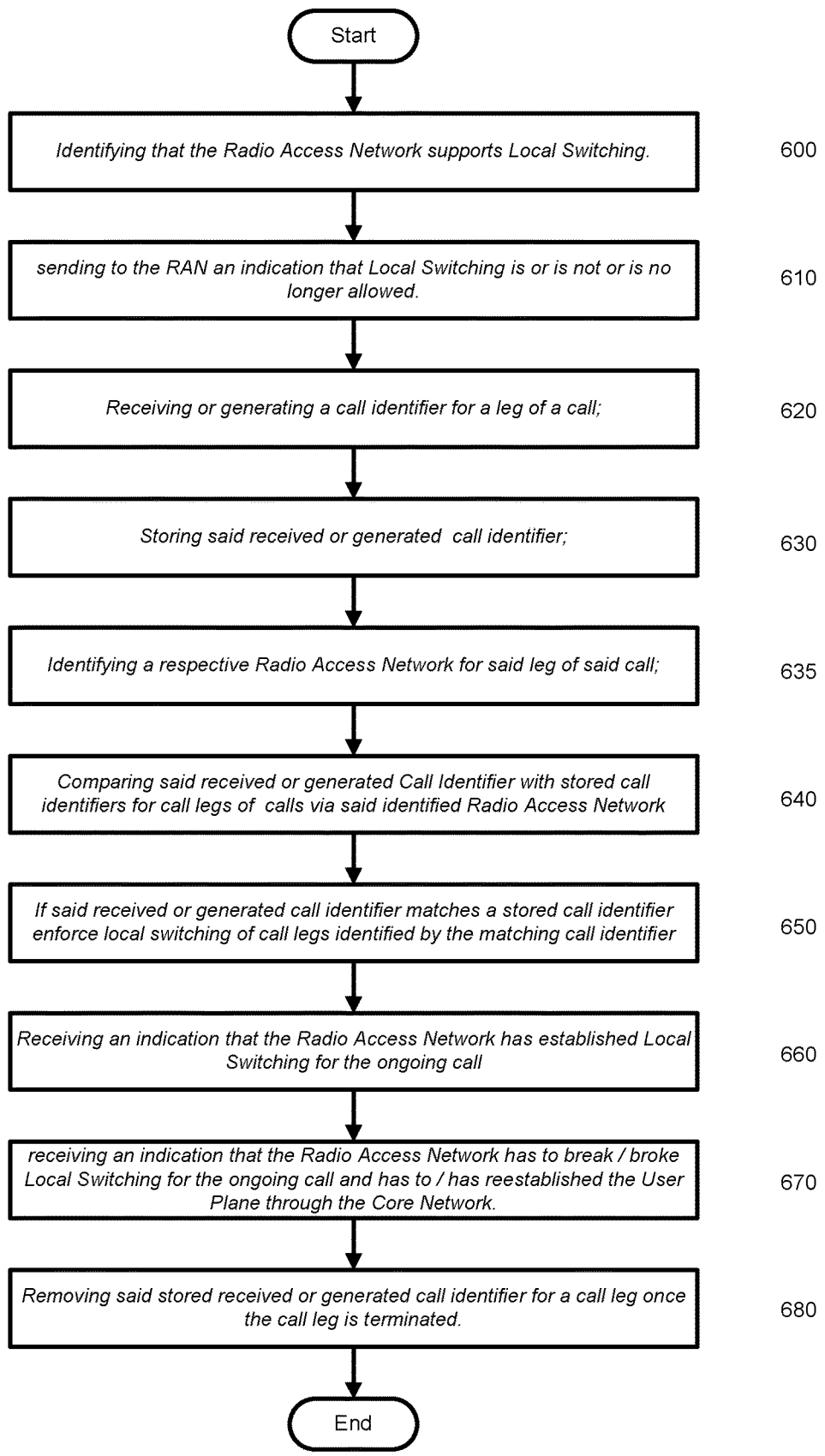
FIG. 6 shows an exemplary flowchart for a method performed by a Core Network according to embodiments of the invention.

In the following reference will also be made to FIG. 6, in which an exemplary flowchart for a method performed by a Core Network according to embodiments of the invention is shown. It is noted that certain method steps may be arranged in a different order and that the order shown in FIG. 6 is of exemplary nature.

There, the Core Network 20, e.g. an originating MSC (oMSC), receives or generates a call identifier for an originating leg of a call, e.g. in a step 620.

In a preferred embodiment, said identifier is unique, at least with respect to the respective RAN.

The received or generated (originating) call identifier is stored in an appropriate memory or database, which might be locally or remotely located, e.g. in a step 630.

Furthermore the Core Network 20 identifies, e.g. receives, a respective Identifier of the originating Radio Access Network 10 (oRAN-ID) for said leg of said call, e.g. in a step 635.

Thereafter, when the call routing is finished and the terminating call leg is found and the respective identifier for the terminating Radio Access Network (tRAN-ID) is known, the Core Network 20, e.g. the oMSC and/or terminating MSC (tMSC), compare(s) said originating call identifier and oRAN-ID of the originating side with said call identifier and tRAN-ID of the terminating side with stored call identifiers for call legs of calls via said identified Radio Access Network 10, e.g. in step 640.

If for an identified Radio Access Network 10 said received or generated call identifier matches a stored call identifier, then the Core Network 20 enforces local switching of the call legs identified by the matching call identifier, e.g. in a step 650.

The Core Network 20 may in further alternative embodiments identify that said identified Radio Access Network 10 supports Local Switching, e.g. by means of a database or memory where configuration data of the Radio Access Network(s) 10 is stored or by receiving an indication that the Radio Access Network 10 supports Local Switching, e.g. in a step 600. This received indication may be call-by-call adapted to the current situation.

The indication provided by the Radio Access Network 10 towards the CN 20 may be embodied in a new information element which may be introduced in an existing handling protocol and existing message, e.g. in the "BSSAP Complete Layer 3 message", a message that can be used by the RAN, e.g. the BSC, to indicate specific capabilities.

In still a further alternative embodiment said stored received or generated call identifier for a call leg is removed from the memory or database once the call leg is terminated, e.g. in a step 680.

In preferred alternative embodiments, the call identifier is generated in early call set-up phase allowing for a fast handling of the Local Switching.

In still further alternative embodiments, the Core Network 20 may provide an indication towards the RAN 10 whether Local Switching of call legs pertaining to a call identifier is allowed or is not allowed or is no longer allowed, e.g. in step 610. E.g. in certain cases it might be appropriate not to allow Local Switching, e.g. for playing announcements or for other reasons like Legal Intercept.

Furthermore, in order to avoid fraud, the establishment of local switching may be made subject to further conditions, i.e. that a certain call phase is reached.

The following will highlight this issue: In certain phases of a call the local switching may not be appropriate, for example in the phase, where the terminating mobile is still in its "ringing phase" and the terminating user has still not accepted the call: here the radio access links may already be established, but the users are not allowed to be through-connected until they explicitly agree (by accepting the call) that the charging begins.

Therefore, as a condition for establishment of Local Switching it may be foreseen that the CN shall indicate towards the Radio Access Network to enable local switching when the CN, e.g. a respective MSC, sends the "Connect" message to the UE and the MGW.

In a still further embodiment the Radio Access Network may send an indication towards the CN that the Radio Access Network has broken the Local Switching for the ongoing call and has already reestablished Switching of the User Plane through the Core Network, e.g. in a step 670. For this embodiment the User Plane through the Core Network is kept established during the duration of the call.

In a still further embodiment the Radio Access Network may send an indication towards the CN that the Radio Access Network has to break the Local Switching for the ongoing call and needs to reestablish Switching of the User Plane through the Core Network, e.g. in a step 670 before the Radio Access Network actually breaks the Local Switching, in order for the Core Network to re-establish all necessary User Plane resources in time. For this embodiment the User Plane through the Core Network may be released during most of the duration of the call.

This may happen if due to some reasons, the Local Switching breaks, e.g. when a Handover for one of the UE is necessary towards a further RAN. In the FIG. 2, this might happen if UE 310 moves back in the Area of RAN 50 and needs to reestablish a link 32 instead of link 31 towards RAN 10

In a still further embodiment the Core Network may send an indication towards the RAN that the Radio Access Network shall break (or shall not establish) the Local Switching for the ongoing call and shall reestablished (or shall keep) the Switching of the User Plane through the Core Network, This can be understood as a further condition which is not met, e.g. in step 650.

The Core Network may optionally indicate that
a) the whole User Plane shall be switched back to the Core Network, i.e. for both call legs in both directions, or
b) the User Plane shall be switched back to the Core Network for particular call leg(s), e.g. one or the other or both call leg(s) in downlink direction (e.g. to play an announcement to one or both), or
c) the User Plane shall be switched back to the Core Network for particular call leg(s), e.g. one or the other or both call legs(s) in uplink direction (e.g. to use the User Plane signals also for other services within the Core Network.

b) Handover Case

The Invention may also be applied in mid-call scenarios. In the following the Invention will be detailed for a handover case described with respect to FIG. 2.

Figure 2:
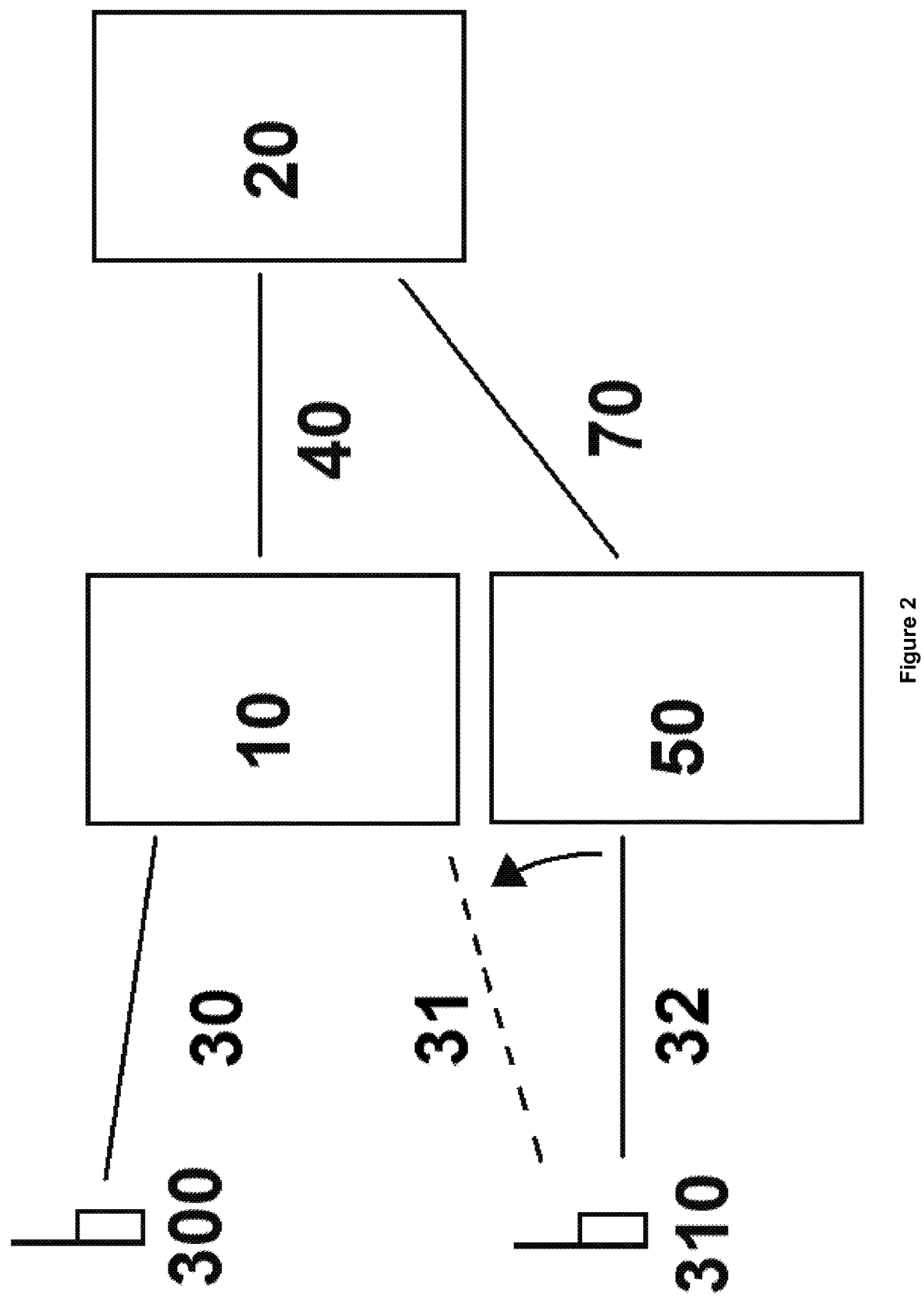
FIG. 2 shows exemplary logical arrangement of a telecommunication network allowing for employing the invention in a Handover case

In FIG. 2, exemplarily two User Equipments UE 300, 310 are shown, which are connected via different Radio Access Networks RAN 10, 50 towards a Core Network 20.

Whether UE 300 or UE 310 is the originating or terminating side of a call is of no importance in the following, because the call is already ongoing. For ease of description it is assumed that UE 310 is the terminating side.

As depicted by the solid line 32, UE 310 is connected via a different RAN 50 than UE 300 to the Core Network 20.

Although, depicted in a limited manner, the invention is understood to work also in the case when the User Equipments 300, 310 are connected not only to a common, but to different, interconnected Core Networks. For example a first Core Network (e.g. a UMTS-Core Network) may serve UTRAN access, while a second Core Network (e.g. a GSM-Core Network) serves GERAN access, where handover from UMTS to GSM or vice versa is supported.

The terminology of Radio Access Network may pertain to any kind of difference, i.e. different Radio Cells handled by a Radio Access Node may as well constitute different RANs in the understanding of the Invention. Furthermore, even different Radio Access Technologies may be understood as different RANs.

When the UE 310 now moves in the reach of Radio Access Network 10, a handover to said RAN 10 may be performed leading to a situation in which a Local Switching could be beneficial.

In that case, (the RAN-centric solution), the RAN has already stored a call identifier for the call leg towards UE 300. When handover of UE 310 is prepared, the RAN will receive from the Core Network 20 the details for the handover. These details may also comprise the indication of the call identifier of the call leg to UE 310 that is to be handed over.

The Core Network 20 sends via link 40 towards the Radio Access Network 10 appropriate messages for the handover call leg to be handled by the Radio Access Network 10. In the described case, it will send handover related messages for the handover call-leg of UE 310 to the RAN 10.

Within these handover related messages according to the invention an identifier of a call is sent.

The Radio Access Network 10 stores the call identifier. The received call identifier is then compared with other stored call identifiers for call legs via the same radio access network 10. Stored call legs are related to both ongoing calls and calls to be set-up. In the case that the received call identifier for UE 310 matches a stored call identifier, here for UE 300, the Radio Access Network 10 establishes local switching of the call legs identified by the matching call identifier. Obviously, as above, the establishment of Local Switching may be made subject to further conditions.

In the example described, the CN 20 will provide a call identifier in a respective messages for the handed over leg of the call, e.g. in a handover message received by RAN 10, towards the RAN 10.

Since this call leg to UE 300 is belonging to an existing call, the Core Network will reuse the existing call identifier. The RAN 10 can then easily store the call identifiers in a memory or a database and can compare the received call identifiers with the stored identifiers.

Such an identifier may be the "Global Call Reference" (GCR), which is an existing true globally unique Identifier for the call, generated and used within the Core Network. The Global Call Reference is generated in an originating Call Control Node of the Core Network, e.g. an MSC (oMSC) and may be used throughout the call in all Core and Transit Networks, even across all operators worldwide (global) to bind the charging together.

After handover, the User Equipment 310 is connected via Link 31 to the same Radio Access Network 10 as the User Equipment 300.

The same ideas as expressed above with respect to the call set-up may now also be employed in a corresponding manner, i.e. the Local Switching may be subject to an allowance sent by the Core Network, and/or the RAN may indicate successful establishment of Local Switching, and so on.

In all call cases, the Local Switching performed in Radio Access Network is not limiting to what may be performed towards the Core Network with respect to the payload over link 40, e.g. an A-Interface. I.e. towards the Core Network there might still exist a need to establish further connections towards Media Gateways or other nodes of the Core Network because of requirements for further call legs. These further call legs may pertain to Conference calls not handled by the same Radio Access Network, Legal Intercept, Announcements and other services.

It is foreseen that the Core Network 20 may provide an indication how to proceed, i.e. whether or not a payload link towards the Core Network shall be kept (dormant, i.e. established, but not transporting data), released or whether this may be subject to the decision of the RAN 10.

It is furthermore foreseen, in case the Radio Access Network indicated towards the Core Network to establish Local Switching, to indicate how the payload resources towards the Core Network (e.g. A-Interface) shall be handled, i.e. whether they are to be kept or to be released.

Furthermore, the Core Network can be adapted to provide indications towards further Core Network Nodes forming part of a call that local Switching shall be applied. In this case further Nodes may provide an indication whether they agree to Local Switching or whether there exists a need not to perform Local Switching.

Depending on the available messages the indication and decision can be placed as well in different messages.

Still further it may be foreseen that the Core Network may request to "break" the local switching on a particular or all call legs and/or the direction it should be broken. Thereby it is enabled to provide announcements or the like which is a one-way communication.

c) Physical Embodiments

The invention may be embodied in single nodes of the respective networks, i.e. a Radio Access Network Node 100 of a Radio Access Network 10 and/or a Core Network Node 200 of a Core Network 20.

Exemplary Radio Access Network Nodes 100 which may embody the invention are for example Base Station Controller, Radio Network Controller, eNodeB. However, any other Node of the Radio Network handling signalling of the Radio Access Network may allow for embodying the invention. Preferably, the Radio Access Network Node is logically close to a Base Station to efficiently save User plane transmission resources.

Figure 3:
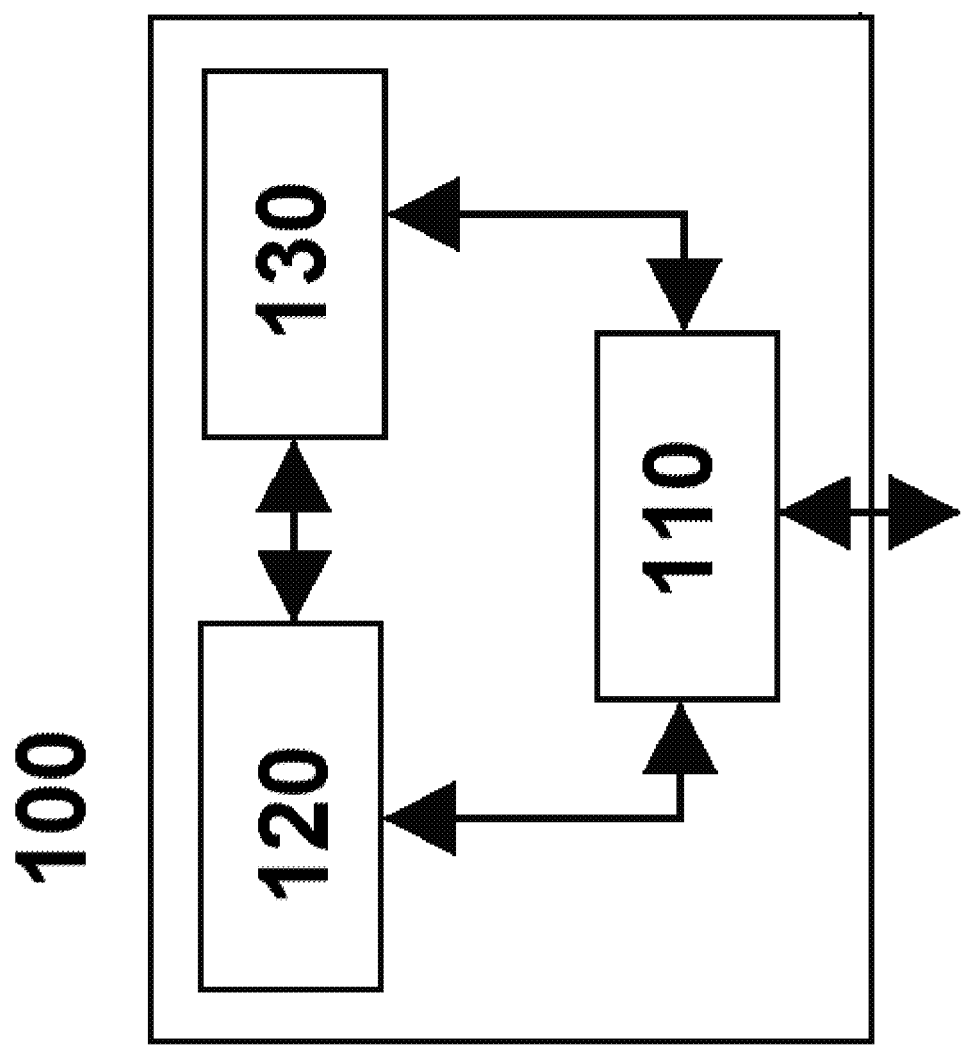
FIG. 3 shows exemplary Radio Access Network Node according to an embodiment of the invention

An exemplary Radio Access Node 100 which is adapted for providing local switching for call legs of a call is depicted in FIG. 3.

The Radio Access Node 100 comprises Means for Receiving 110 a call identifier for a leg of a call from a Core Network 20 to be handled by the Radio Access Network Node 100.

Said Means for Receiving 110 may be embodied as an Input part of an Input/Output unit, a Network Interface Card or the like.

Furthermore, said Radio Access Node 100 comprises Means for Storing 120 said received call identifier.

Said Means for Storing 120 may be embodied as a memory, in different kind of memory either as an electronic memory such as RAM, EPROM, EEPROM, or storage device such as any kind of electronic, optical or magnetic storage medium, including a Solid State or Flash disk.

Still further, said Radio Access Node 100 comprises Means for Comparing 130 said received call identifier with stored call identifiers for call legs of calls via said Radio Access Network Node. Said Means for Comparing 130 further being adapted for determining if said received call identifier matches a stored call identifier and said Means for Comparing 130 being further adapted to enforce local switching of call legs identified by the matching call identifier.

Said Means for Comparing 130 may be embodied as a processor including a Digital Signal Processor (DSP) or controller or may even be embodied in an ASIC or a FPGA or any other appropriate device.

In a further embodiment, said Radio Access Network Node 100 further comprises Means for Sending 110 to said Core Network 20 an indication that the Radio Access Network Node 100 supports Local Switching.

Said Means for Sending 110 may be embodied as an Output part of an Input/Output unit, a Network Interface Card or the like.

In a further embodiment, the Means for Storing 120 of said Radio Access Network Node 100 are further adapted for Removing said stored received call identifier for a call leg once the call leg is terminated.

In still a further embodiment, said identifier is received in the course of a call set-up for said call or in the course of a handover for said call.

Another further embodiment said means for receiving 110 are further adapted to receive from said Core Network 20 an indication whether Local Switching is allowed.

The indication provided by the Radio Access Network Node 100 towards the CN 20 may be embodied in a new information element which may be introduced in an existing handling protocol, e.g. in the BSSAP Complete Layer 3 message, a message that can be used by the RAN, e.g. the BSC, to indicate specific capabilities.

In still a further embodiment, said means for sending 110 may be further adapted for sending towards the CN 20 an information that the Local Switching has been established for the ongoing call.

In still a further embodiment, said means for sending 110 are further adapted for sending towards the CN 20 an indication that the Radio Access Network has broken the Local Switching for the ongoing call and has re-established to User Plane through the Core Network.

In a still further embodiment, said means for sending 110 are further adapted to send an indication towards the CN that the Radio Access Network has broken the Local Switching for the ongoing call and has already reestablished Switching of the User Plane through the Core Network.

In a still further embodiment, said means for sending 110 are further adapted to send an indication towards the CN that the Radio Access Network has to break the Local Switching for the ongoing call and needs to reestablish Switching of the User Plane through the Core Network before the Radio Access Network actually breaks the Local Switching, in order for the Core Network to re-establish all necessary User Plane resources in time.

In a still further embodiment, said means for receiving 110 are further adapted to receive from the Core Network an indication that the Radio Access Network shall break (or shall not establish) the Local Switching for the ongoing call and shall reestablished (or shall keep) the Switching of the User Plane through the Core Network. Said indication may be evaluated by said means for comparing 130.

The Radio Access Network Node 100 may further be adapted to receive from the Core Network in a further embodiment an indication that
a) the whole User Plane shall be switched back to the Core Network, i.e. for call legs in both directions, or
b) the User Plane shall be switched back to the Core Network for particular call leg(s), e.g. one or the other or both call leg(s) in downlink direction (e.g. to play an announcement to one or both), or
c) the User Plane shall be switched back to the Core Network for particular call leg(s), e.g. one or the other or both call legs(s) in uplink direction (e.g. to use the User Plane signals also for other services within the Core Network.

As already stated the invention may be embodied in single nodes of the respective networks, i.e. a Radio Access Network Node 100 of a Radio Access Network 10 and/or a Core Network Node 200 of a Core Network 20.

Exemplary Core Network Nodes 200 which may embody the invention are for example Mobile Switching Center Server. However, any other Node of the Core Network handling signalling of the Core Network may allow for embodying the invention.

Figure 4:
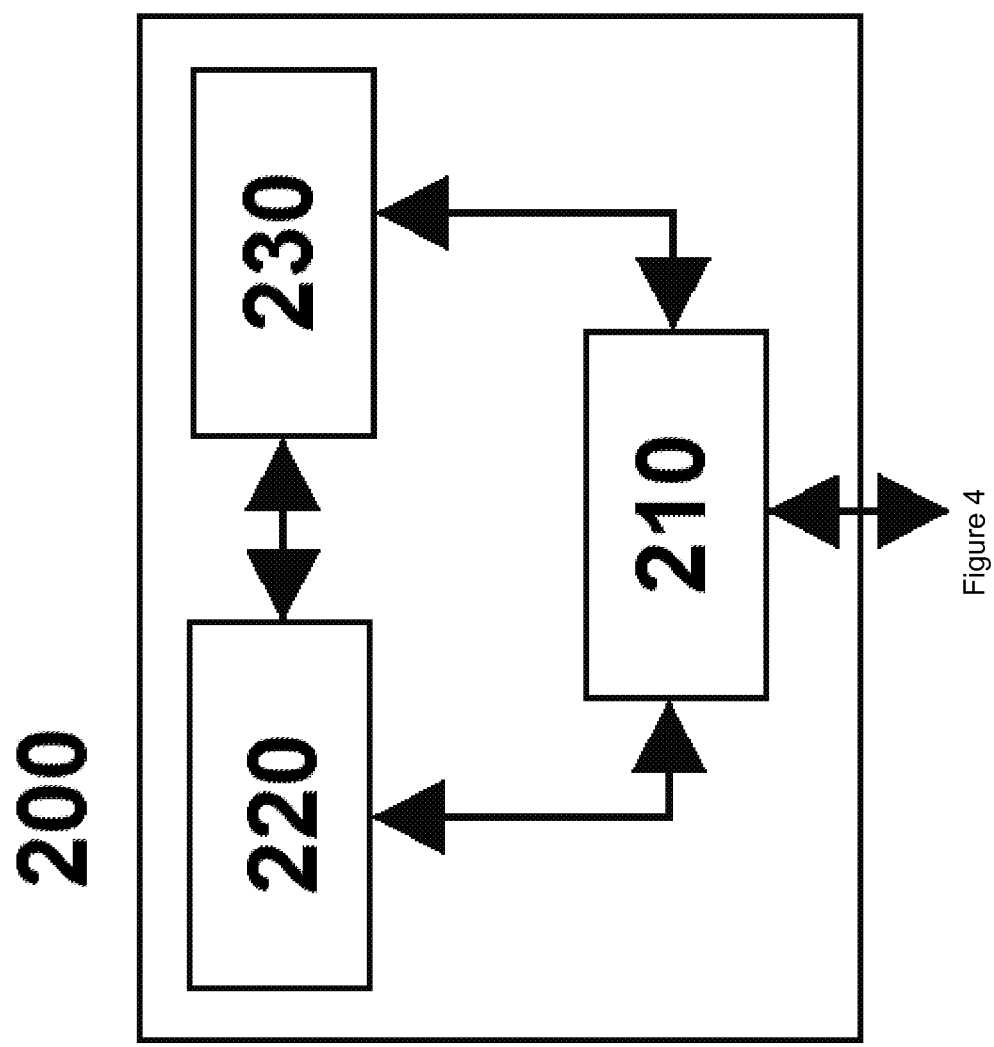
FIG. 4 shows an exemplary Core Network Node according to an embodiment of the invention.

An exemplary Core Network Node 200 which is adapted for providing local switching for call legs of a call is depicted in FIG. 4.

The Core Network Node 200 comprises Means for Receiving or generating 210 a call identifier for a leg of a call.

Said Means for Receiving 210 may be embodied as an Input part of an Input/Output unit, a Network Interface Card or the like.

Furthermore, said Core Network Node 200 comprises Means for Storing 220 said received or generated call identifier.

Said Means for Storing 220 may be embodied as a memory, in different kind of memory either as an electronic memory such as RAM, EPROM, EEPROM, or storage device such as any kind of electronically, optical or magnetic storage medium, including a Solid State or Flash disk.

Additionally, said Core Network Node 200 comprises Means for Identifying 230 a respective Radio Access Network for said leg of said call. Said Means for Identifying 230 are further adapted for Comparing said received or generated call identifier with stored call identifiers for call legs of calls via said identified Radio Access Network. Said Means for Identifying 230 further adapted for determining if said received or generated call identifier matches a stored call identifier and said Means for Identifying 230 are further adapted to enforce local switching of call legs identified by the matching call identifier.

Said Means for Identifying 230 may be embodied as a processor including a Digital Signal Processor (DSP) or controller or may even be embodied in an ASIC or a FPGA or any other appropriate device.

In a still further alternative embodiment said Means for Identifying 230 are further adapted for identifying that said identified Radio Access Network supports Local Switching.

In a still further alternative embodiment said Means for Receiving 210 are further adapted for receiving an indication that the Radio Access Network supports Local Switching.

The indication provided by the RAN 10 towards the Core Network Node 200 may be embodied in a new information element which may be introduced in an existing handling protocol, e.g. in the BSSAP Complete Layer 3 message, a message that can be used by the RAN, e.g. the BSC, to indicate specific capabilities.

Additionally, in a further alternative embodiment said Means for Storing 220 are further adapted for Removing said stored received or generated call identifier for a call leg once the call leg is terminated.

In a preferred alternative embodiment said call identifier is generated in the course of a call set-up for said call or in the course of a handover for said call.

In still a further embodiment said Core Network Node comprises means for sending 210 to the Radio Network an indication whether Local Switching is allowed.

Said Means for Sending 210 may be embodied as an Output part of an Input/Output unit, a Network Interface Card or the like.

In still a further embodiment, said means for receiving 210 may be further adapted for receiving an information of the RAN 10 that the Local Switching has been established for the ongoing call.

In still a further embodiment, said means for receiving 210 are further adapted for receiving from the RAN 10 an indication that the Radio Access Network has broken the Local Switching for the ongoing call and has re-established to User Plane through the Core Network.

In a still further embodiment, the means for sending 210 are further adapted to send to the Core Network an indication that the Radio Access Network has broken the Local Switching for the ongoing call and has already reestablished Switching of the User Plane through the Core Network. For this embodiment the User Plane through the Core Network is kept established during the duration of the call.

In a still further embodiment, the means for sending 210 are further adapted to send an indication towards the CN that the Radio Access Network has to break the Local Switching for the ongoing call and needs to reestablish Switching of the User Plane through the Core Network before the Radio Access Network actually breaks the Local Switching, in order for the Core Network to re-establish all necessary User Plane resources in time. For this embodiment the User Plane through the Core Network may be released during most of the duration of the call.

This may happen if due to some reasons, the Local Switching breaks, e.g. when a Handover for one of the UE is necessary towards a further RAN. In the FIG. 2, this might happen if UE 310 moves back in the Area of RAN 50 and needs to reestablish a link 32 instead of link 31 towards RAN 10

In a still further embodiment, the means for sending 210 are further adapted to send an indication towards the RAN that the Radio Access Network shall break (or shall not establish) the Local Switching for the ongoing call and shall reestablished (or shall keep) the Switching of the User Plane through the Core Network.

In a still further embodiment, the means for sending 210 are further adapted to send an indication towards the RAN that
a) the whole User Plane shall be switched back to the Core Network, i.e. for both call legs in both directions, or
b) the User Plane shall be switched back to the Core Network for particular call leg(s), e.g. one or the other or both call leg(s) in downlink direction (e.g. to play an announcement to one or both), or
c) the User Plane shall be switched back to the Core Network for particular call leg(s), e.g. one or the other or both call legs(s) in uplink direction (e.g. to use the User Plane signals also for other services within the Core Network.

Obviously, all the methods as presented above may be embodied in hardware, software enabled hardware and software offering the corresponding program logic itself when run on a corresponding programmable device, either in part or as a whole.

By means of the invention it is provided for a saving of resources in the Core Network allowing to increase the capacity and even more allows for improved Quality since the less transporting happens the less delay is introduced leading to an improved user experience.

Furthermore, by means of the invention it is provided for an easy deployment necessitating no O&M activity.

Additionally, Local Switching can not only be performed on Call set-up but also in later stages if Local Switching becomes available.

By means of interworking of Core Network and Radio Access Network it is also possible to encompass more sophisticated call scenarios involving Legal Intercept, Conference Calls and Announcements, i.e. allowing for a never before experienced flexibility.

By means of signalling towards intermediate nodes, the system is fault tolerant.

ABBREVIATIONS

3GPP 3rd generation Partnership Project
BSC Base Station Controller
BSS Base Station Subsystem
BSSAP Base Station System Application Part
BTS Base Transceiver Station
CN Core Network
GSM Global System for Mobile communications
GERAN GSM-EDGE Radio Access Network
HO Handover
ID Identifier
MSC Mobile Switching Center
MSS Mobile Soft Switch (Core Network)
RAT Radio Access Technology
MGW Media Gateway
UTRAN Universal Telecommunication Radio Access Network
UMTS Universal Mobile Telecommunication System
MSC Mobile Service Switching Centre

The invention claimed is:

1. A method implemented in a Radio Access Network comprising:
receiving a message from a Core Network, the message comprising a call identifier for a first leg of a call, wherein the call identifier uniquely identifies the first leg of the call;
storing the received call identifier in memory;
comparing the received call identifier with previously stored call identifiers for call legs of calls supported by the Radio Access Network;
receiving, from the Core Network, an indication that Local Switching is not allowed or is no longer allowed for a previously stored call identifier of the previously stored call identifiers; and
responsive to the received call identifier matching the previously stored call identifier, refraining from local switching between the call legs that correspond to the matching call identifiers.

2. The method of claim 1, further comprising:
sending the Core Network an indication that the Radio Access Network supports Local Switching.

3. The method of claim 1, further comprising:
sending the Core Network an indication that the Radio Access Network has established Local Switching between the call legs that correspond to the matching call leg identifiers.

4. The method of claim 1, further comprising:
removing the received call identifier from memory once the call leg that corresponds to the received call identifier is terminated.

5. The method of claim 1, where the received call identifier uniquely identifying the first leg of the call is an identifier unique in the Radio Access Network and the Core Network.

6. The method of claim 1,
wherein the indication indicates to break local switching for an ongoing call and reestablish the switching of a user plane through the Core Network; and
wherein the refraining from local switching comprises breaking local switching for the ongoing call and reestablishing the switching of a user plane through the Core Network.

7. The method of claim 1, wherein the indication indicates to not establish local switching for an ongoing call and keep switching of a user plane through the Core Network.

8. The method of claim 1, wherein the indication indicates that local switching between call legs in one of an uplink or downlink direction will not be allowed, or is no longer allowed, and User Plane traffic must go through the Core Network while call legs in the opposite direction are allowed to use local switching such that User Plane traffic between the locally switched call legs bypasses the Core Network.

9. The method of claim 1, wherein the message is a handover message, and the call identifier uniquely identifies the first leg of the call to be handed over to the Radio Access Network.

10. A method implemented in a Core Network comprising:
receiving or generating a first call identifier generated by the Core Network for a leg of a call, wherein the first call identifier uniquely identifies the leg of the call;

storing the first call identifier in memory;
identifying a respective Radio Access Network for the leg of the call;
comparing the first call identifier with previously stored call identifiers for call legs of calls supported by the identified Radio Access Network; and
responsive to the first call identifier matching one of the previously stored call identifiers, sending to the Radio Access Network an indication that local switching between call legs pertaining to the first call identifier is not allowed or is no longer allowed.

11. The method of claim 10, further comprising:
identifying that the identified Radio Access Network supports Local Switching.

12. The method of claim 10, further comprising:
removing the first call identifier from memory responsive to the call leg that corresponds to the first call identifier being terminated.

13. The method of claim 10, wherein the first call identifier is an identifier unique in the Radio Access Network and the Core Network.

14. The method of claim 10, wherein the sending the indication is further responsive to determining a particular call phase of the call from a set of call phases.

15. The method of claim 14, wherein the particular call phase indicates a recipient of the call has not accepted the call or has not accepted charging for the call.

16. The method of claim 10, wherein the receiving or generating is in the course of handover for the leg of the call.

17. The method of claim 10, wherein the indication indicates to break local switching for an ongoing call and reestablish the switching of a user plane through the Core Network.

18. The method of claim 10, wherein the indication indicates to not establish local switching for an ongoing call and keep switching of a User Plane through the Core Network.

19. The method of claim 10, wherein the indication indicates that local switching between call legs in one of an uplink or downlink direction will not be allowed, or is no longer allowed, and User Plane traffic must go through the Core Network while call legs in the opposite direction are allowed to use local switching such that User Plane traffic between the locally switched call legs bypasses the Core Network.

20. A Radio Access Network Node comprising:
a receiver circuit configured to receive a message from a Core Network, the message comprising a call identifier for a leg of a call, wherein the call identifier uniquely identifies the first leg of the call;
memory configured to store the received call identifier; and
a control circuit operatively connected to the receiver circuit and the memory, and being configured to:
compare the received call identifier with previously stored call identifiers for call legs of calls supported by the Radio Access Network Node;
determine if the received call identifier matches one of the previously stored call identifiers;
receive, from the Core Network, an indication that Local Switching is not allowed or is no longer allowed for a previously stored call identifier of the previously stored call identifiers; and
responsive to the received call identifier matching the previously stored call identifier, refrain from local switching between the call legs that correspond to the matching call identifiers.

21. The Radio Access Network Node of claim 20, further comprising:
a transmitter circuit configured to send the Core Network an indication that the Radio Access Network Node supports Local Switching.

22. The Radio Access Network Node of claim 20, wherein the control circuit is configured to remove the received call identifier from memory once the call leg that corresponds to the received call identifier is terminated.

23. A Core Network Node in a Core Network comprising:
a receiver circuit configured to receive or to generate a first call identifier generated by the Core Network for a leg of a call, wherein the first call identifier uniquely identifies the leg of the call;
memory configured to store the first a first call identifier; and
a control circuit operatively connected to the receiver circuit and the memory, the control circuit being configured to:
identify a respective Radio Access Network for the leg of the call;
compare the first call identifier with previously stored call identifiers for call legs of calls supported by the identified Radio Access Network;
determine if the first call identifier matches one of the previously stored call identifiers; and
responsive to the first call identifier matching one of the previously stored call identifiers, sending to the Radio Access Network an indication that local switching between call legs pertaining to the first call identifier is not allowed or is no longer allowed.

24. The Core Network Node of claim 23, wherein the control circuit is further configured to identify that the identified Radio Access Network supports Local Switching.

25. The Core Network Node of claim 23, wherein the control circuit is further configured to remove the first call identifier from memory once the call leg that corresponds to the first call identifier is terminated.

* * * * *

UNITED STATES PATENT AND TRADEMARK OFFICE
CERTIFICATE OF CORRECTION

PATENT NO. : 10,750,574 B2  
APPLICATION NO. : 13/319147  
DATED : August 18, 2020  
INVENTOR(S) : Kampmann et al.

Page 1 of 1

It is certified that error appears in the above-identified patent and that said Letters Patent is hereby corrected as shown below:

In the Specification

In Column 3, Lines 10-11, delete "invention" and insert -- invention, --, therefor.

In Column 3, Line 14, delete "case" and insert -- case, --, therefor.

In Column 3, Line 16, delete "invention" and insert -- invention, --, therefor.

In Column 6, Line 29, delete "10" and insert -- 10. --, therefor.

In Column 7, Line 63, delete "10" and insert -- 10. --, therefor.

In Column 8, Line 41, delete "Radio Access Node" and insert -- Radio Access Network Node --, therefor.

In Column 10, Line 15, delete "Radio Access Node" and insert -- Radio Access Network Node --, therefor.

In Column 10, Line 18, delete "Radio Access Node" and insert -- Radio Access Network Node --, therefor.

In Column 10, Line 25, delete "Radio Access Node" and insert -- Radio Access Network Node --, therefor.

In Column 10, Line 32, delete "Radio Access Node" and insert -- Radio Access Network Node --, therefor.

In Column 13, Line 9, delete "10" and insert -- 10. --, therefor.

Signed and Sealed this  
Twenty-ninth Day of December, 2020

Andrei Iancu  
*Director of the United States Patent and Trademark Office*